(No Model.)
J. FREYNE.
SOFT TREAD HORSESHOE.
No. 561,217. Patented June 2, 1896.
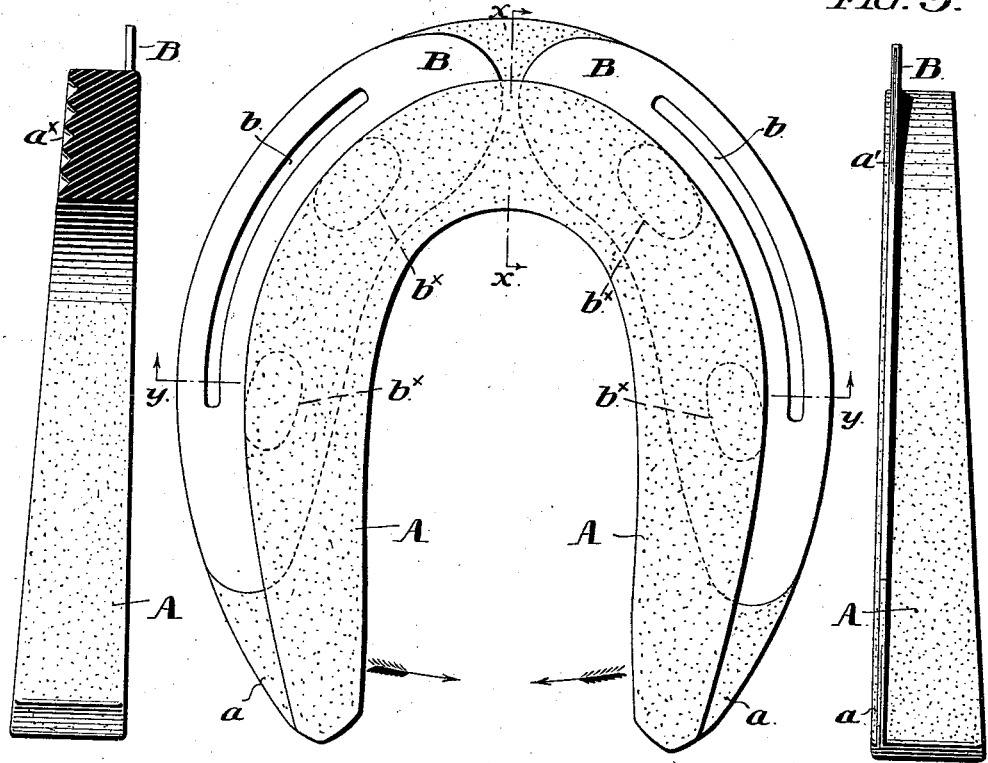
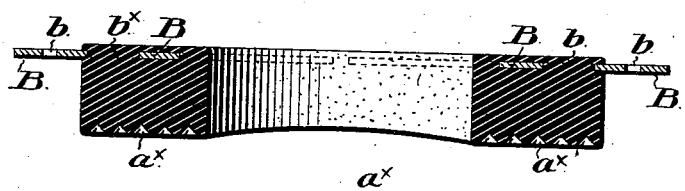
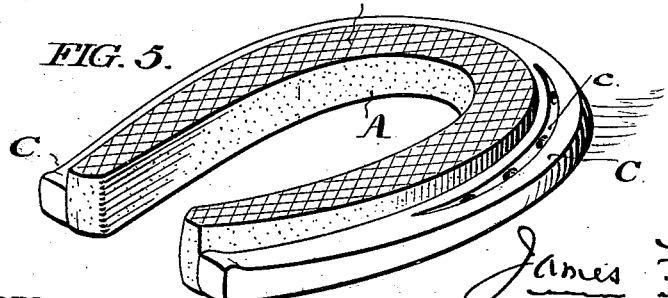
WITNESSES:
A. E. Paige
F. Norman Dixon
James Freyne,
INVENTOR:
By his Attorneys,
Wm. C. Strawbridge
J. Bonsall Taylor

UNITED STATES PATENT OFFICE.

JAMES FREYNE, OF PHILADELPHIA, PENNSYLVANIA.

SOFT-TREAD HORSESHOE.

SPECIFICATION forming part of Letters Patent No. 561,217, dated June 2, 1896.

Application filed December 18, 1895. Serial No. 572,527. (No model.)

*To all whom it may concern:*

Be it known that I, JAMES FREYNE, a citizen of the United States, residing in the city and county of Philadelphia, in the State of Pennsylvania, have invented certain new and useful Improvements in Horseshoes, of which the following is a specification.

The object of my invention is the construction of a horseshoe which shall not be liable to slip upon frozen or otherwise slippery pavements, but shall act as a cushion and leave the frog and sole of the hoof free; and to such end the invention, generally stated, comprehends a horseshoe formed of india-rubber or equivalent adherent material, with which are combined attaching-plates of metal, by the aid of which the shoe as an entirety may be secured, either directly or through the intervention of the usual metal horseshoe, to the hoof of the horse.

In the accompanying drawings I have illustrated, and hereinafter I describe, a good form of horseshoe embodying my invention, the particular subject-matter which I claim as novel being hereinafter definitely specified.

In the drawings, Figure 1 is a bottom plan view of a horseshoe embodying my improvements. Fig. 2 is a central longitudinal side sectional elevation through the horseshoe of Fig. 1 in the plane of the dotted line $x\,x$ upon said figure, and sight being taken in the direction of the arrows upon said line. Fig. 3 is a right-hand side elevation of the horseshoe represented in Fig. 1. Fig. 4 is a transverse sectional end elevation through the horseshoe of Fig. 1 in the plane of the dotted line $y\,y$ upon said figure. Fig. 5 is a view in perspective of my improved shoe as applied in conjunction with an ordinary metal horseshoe.

Similar letters of reference indicate corresponding parts.

In the drawings, A represents a horseshoe of the usual form, except that it is preferably without either toe or heel calks and made flat, which according to my invention is composed wholly of india-rubber or of any other equivalent substance or composition of matter that possesses sufficient strength and coherence to be durable, and is at the same time adherent, to prevent its slipping upon slippery surfaces.

B B are a pair of counterpart but reversely-disposed attaching-plates, which preferably possess some such segmental form as that shown in Fig. 1 of the drawings, in which their inner boundaries are shown in dotted lines, and which are provided with nail slots or holes $b$, so disposed that in the application of the plates they are exterior to the outer edges of the shoe and occupy, respectively, positions relatively abreast of the quarters of the shoe. These attaching-plates are secured within the substance of the horseshoe proper, A, conveniently by having the substance of said horseshoe cast about them while they are suitably disposed in a proper mold and so cast as to pass through and fill up apertures $b^\times$, formed through the substance of the attaching-plates in that region of said plates which the material of the shoe underlies. By this means the plates are as to their entire inner portions cast within and with, so to speak, the substance of the shoe and are firmly connected therewith, so that their displacement becomes impossible. By the aid of their nail-slots these plates afford a means for attaching the shoe as an entirety to the hoof of the horse.

I find it convenient, although it is not necessary, in the casting of the shoe to cast supplemental webs $a$ as continuations, so to speak, of the plates in the region of the heels of the shoe. I also find it convenient to cast a film or layer $a'$, of rubber, completely over the upper surface of that portion of the plates which are embedded within the substance of the shoe.

It is obvious that the shoe as represented in the first four figures of the drawings is adapted to be applied direct to the horse's hoof, and, when applied to, serves not only as a shoe, but as a creeper, by the aid of which the animal's hoof is both shod and kept from slipping.

In Fig. 5 I have represented the shoe shown in the other figures employed in conjunction with an ordinary metal horseshoe C, which is applied so as to surround the rubber shoe and rest against its attaching-plates, the fullering or creases $c$ in the lower face of the metal shoe registering with the nail-slots in the attaching-plates of the rubber shoe, so that nails driven through the holes in the fullering pass through the slots in the attaching-plates.

I prefer, although I do not desire to confine myself to it, to roughen or corrugate the under surface of the shoe, as indicated by the corrugations $a^\times$ in Figs. 2, 4, and 5.

It is of course manifest that, if I so desire, the attaching-plates B B may be made as a single or integral plate, the division in the region of the toe of the shoe being obliterated.

Having thus described my invention, I claim and desire to secure by Letters Patent—

A horseshoe composed of rubber and provided with laterally-projecting plates of metal formed with nail holes or slots and with apertures that are filled with the rubber of the shoe and therefore serve to effect the permanent retention of the plates with respect to the shoe, substantially as set forth.

In testimony that I claim the foregoing as my invention I have hereunto signed my name this 16th day of December, A. D. 1895.

JAMES FREYNE.

In presence of—
  J. BONSALL TAYLOR,
  JOHN R. NOLAN.